(12) United States Patent
Kim

(10) Patent No.: US 7,150,107 B2
(45) Date of Patent: Dec. 19, 2006

(54) STRUCTURE AND METHOD FOR HOLDING AND PROTECTING VIALS IN LEVELS

(75) Inventor: Charles D. Kim, Raleigh, NC (US)

(73) Assignee: Empire Level Mfg. Corp., Mukwonago, WI (US)

( * ) Notice: Subject to any disclaimer, the term of this patent is extended or adjusted under 35 U.S.C. 154(b) by 0 days.

(21) Appl. No.: 10/826,941

(22) Filed: Apr. 17, 2004

(65) Prior Publication Data

US 2005/0229416 A1    Oct. 20, 2005

(51) Int. Cl.
*G01C 9/28* (2006.01)
(52) U.S. Cl. .......................................... 33/451; 33/365
(58) Field of Classification Search .................. 33/451, 33/365, 374, 377, 379, 381–382
See application file for complete search history.

(56) References Cited

U.S. PATENT DOCUMENTS

| | | | | |
|---|---|---|---|---|
| 684,846 | A | * | 10/1901 | Moss .......................... 33/374 |
| 4,407,075 | A | * | 10/1983 | MacDermott et al. ..... 33/348.2 |
| 4,607,437 | A | * | 8/1986 | McSorley et al. ............ 33/374 |
| 5,199,177 | A | * | 4/1993 | Hutchins et al. ........... 33/348.2 |
| 5,233,760 | A | * | 8/1993 | Patterson ..................... 33/376 |
| 5,406,714 | A | * | 4/1995 | Baker et al. .................. 33/382 |
| 5,438,761 | A | * | 8/1995 | Krumszyn et al. ............ 33/451 |
| 5,459,935 | A | * | 10/1995 | Paulson et al. ............... 33/451 |
| 5,651,186 | A | * | 7/1997 | Lindner et al. ............... 33/377 |
| 5,709,034 | A | * | 1/1998 | Kohner ........................ 33/377 |
| 6,792,686 | B1 | * | 9/2004 | Krehel et al. ................. 33/382 |
| 2002/0186123 | A1 | * | 12/2002 | Kivisto et al. ......... 340/286.07 |
| 2003/0005592 | A1 | * | 1/2003 | Wang .......................... 33/451 |
| 2003/0079357 | A1 | * | 5/2003 | Liao ............................ 33/374 |

\* cited by examiner

*Primary Examiner*—Yaritza Guadalupe-McCall
(74) *Attorney, Agent, or Firm*—Jansson, Shupe, Munger & Antaramian, Ltd.

(57) ABSTRACT

A level and a method of forming such a level are disclosed. The level comprises a body having a measuring surface and a recess, a vial positioned in the recess at an angular relationship to the measuring surface, and a ring member enclosing the vial within the recess, the ring member engaging the vial and the body and fastened to the body, the ring member having a beveled edge forming a funnel-shaped surface defining slope lines, the slope lines intersecting the vial, whereby the vial is protected by the level and ring member while visibility of the vial is enhanced. The method comprises providing a level with a recess and a measuring surface, positioning the vial in the recess at an angular relationship to the measuring surface, and enclosing the vial within the recess with a ring member, the ring member having beveled edges forming a funnel-shaped surface.

19 Claims, 4 Drawing Sheets

STRUCTURE AND METHOD FOR HOLDING AND PROTECTING VIALS IN LEVELS

FIELD OF THE INVENTION

This invention relates to geometric instruments and, more particularly, to levels (sometimes referred to as "spirit levels") used by carpenters and the like.

BACKGROUND OF THE INVENTION

Levels are used by carpenters, masons, drywallers and the like for helping to assure that surfaces are horizontal, vertical, or at a specified angular relationship to the horizon. A typical level includes at least two vials, one each for ascertaining whether a surface is "level," i.e., horizontal, or "plumb," i.e., vertical.

A level vial comprises a tube made of clear glass or, preferably, clear plastic (acrylic, for example), the barrel-shaped cavity of which is partially filled with a liquid such as mineral spirits. The vial is not completely filled and a bubble is thereby formed when the vial is closed. Typically, two marker rings are applied to the outside of the vial in positions to visually divide the cavity into three portions of about equal length. Level and plumb conditions are ascertained by noting the position of the bubble with respect to the marker rings.

The plumb vial is typically disposed within the web member of a level which connects the two measuring surfaces. Often such plumb vials are simply inserted into an aperture in such web member. However, such attachment often does not provide sufficient support or protection to the plumb vial (or any other vial mounted in the web portion.)

An improved level which provides support to such vials and provides for increased protection of such vials would be an important advance in the art. Furthermore, such a level which does not subtract from the visibility of such vials or which provides superior visibility of such vials would significantly improve upon the prior art. Finally, an improved level protecting such vials with an impact-absorbing structure would solve these noted problems in the prior art.

OBJECTS OF THE INVENTION

It is an object of the invention to provide an improved level vial overcoming some of the problems and shortcomings of the prior art.

Another object of the invention is to provide a level which secures vials to its side surface with beveled members to funnel vision toward the vials.

Another object of the invention is to provide a method of forming such improved levels.

Another object of the invention is to provide an improved level having dual-density ring members securing vials to the level.

Another object of the invention is to provide an improved level which secures its levels with compressible material to improve impact resistance.

Another object of the invention is to provide an improved level including vial securements with contrasting colors to focus vision on the vial.

Another object of the invention is to provide a new method which results in a level having vials which are secure and impact resistant.

How these and other objects are accomplished will become apparent from the following descriptions and from the drawings.

SUMMARY OF THE INVENTION

In at least one embodiment, the invention is a level providing for increased protection and visibility of a vial positioned therein. The invention represents a significant advance over the state of the art by providing novel elements, including a beveled-edge ring member.

In one embodiment, the invention is a method of mounting a vial in a level providing for increased visibility of the vial. Such method comprises providing a level with a recess and a measuring surface; positioning the vial in the recess at an angular relationship to the measuring surface; and enclosing the vial within the recess with a ring member having beveled edges forming a funnel-shaped surface. In certain embodiments the ring member comprises front and rear portions with the vial positioned therebetween and the front and rear portions have the beveled edges forming a funnel-shaped surface.

In certain embodiments, the ring member is a first ring member with first front and rear portions, and the method further comprises enclosing the first ring member with a second ring member having front and rear portions, the second portions having beveled edges aligned with the funnel-shaped surface of the first portions.

The ring member, and more particularly the second portions, may include wing members having apertures therein and the level may have openings spaced from the recess such that the method further comprises securing the second ring member to the level by passing fasteners through the apertures and the openings.

In certain embodiments, the method includes using first and second ring members which have contrasting colors to outline the vial. In certain embodiments, the second ring member is a soft elastomeric providing impact-absorption to the level. In certain embodiments, the first and second ring members are bonded together before the vial is enclosed in the recess.

The invention also includes a level having a vial secured thereto, the level comprising a body having a measuring surface and a recess; a vial positioned in the recess at an angular relationship to the measuring surface; and a ring member enclosing the vial within the recess, the ring member comprising front and rear portions with the vial positioned therebetween, the front and rear portions having beveled edges forming a funnel-shaped surface.

In certain embodiments, the ring member is a first ring member with first ring member portions, and the level further comprises a second ring member enclosing the first ring member, the second ring member having front and rear portions, the second portions having beveled edges aligned with the funnel-shaped surface of the first portions. The first and second ring members may have contrasting colors to outline the vial, as an example the second ring may be black or grey and the first ring may be yellow. Contrasting colors provide an easily perceived visual interface between the first and second ring.

The second ring member is preferably a soft elastomeric providing impact-absorption to the level. As such, the second ring member can be compressed by impacts with other objects, with such compression dissipating the impact force. The first ring member may also be an elastomeric member. It is preferably harder than the second ring member and less easily compressed. As such, the first ring member preferably has a higher density than the second ring member. In certain embodiments, the first ring member is acrylonitrile butadiene styrene and the second ring member is thermoplastic rubber. In other embodiments in which other characteristics are desired, the first ring member is thermoplastic rubber and the second ring member is acrylonitrile butadiene styrene. In certain embodiments, the first and second ring members are bonded together before the vial is enclosed in the recess. Such bonding of elastomeric materials having different densities can be accomplished through co-molding the first and second ring members such that they are manufactured together in one piece.

The ring member or, more specifically, the second portions preferably include wing members having apertures therein. The level preferably has openings spaced from the recess, such that the apertures and openings can receive fasteners to secure the second ring member to the level.

In other embodiments, the invention is a level having a vial secured thereto, with the level comprising a body having a measuring surface and a recess; a vial positioned in the recess at an angular relationship to the measuring surface; and a ring member enclosing the vial within the recess, the ring member engaging the vial and the body and fastened to the body, the ring member having a beveled edge forming a funnel-shaped surface defining slope lines, the slope lines intersecting the vial, whereby the vial is protected by the level and ring member while visibility of the vial is enhanced.

It is preferred that the vial include a central portion where a bubble rests when the vial is level, the slope lines intersecting the central portion. In other words, the center of the funnel shape is in the central portion of the vial. Such an arrangement allows an increased amount of light to reach the vial since the funnel-shaped surface does not block any light, i.e., the outer edge of the ring member may block light, but light passing such outer edge reaches the vial without being blocked by the funnel-shaped surface. In certain designs, the outer edge of the ring member is set into the level body and does not block any light from reaching the vial.

The ring member may include wing members having apertures therein such that the apertures and openings in the level spaced from the recess receive fasteners to secure the ring member to the level. The ring member may include inner and outer layers. Such inner and outer layers may form a single integral dual-density compound material. In certain embodiments, the inner and outer layers have contrasting colors to outline the vial. As stated above, such contrasting colors provide an easily perceived visual interface around the vial. Contrasting colors include black and yellow, grey and yellow, and other dark colors paired with light colors, particularly light colors which are bright such as yellow.

In addition to enhancing the visibility of the vial, in certain embodiments the ring member provides impact absorption to the level by providing inner and outer layers which are elastomeric and provide impact-absorption to the level. Such inner and outer layers may have varying densities and compressibility to provide a desired impact absorption level. In certain embodiments, the outer layer has a lower density than the inner layer. In some preferred embodiments, the inner layer is acrylonitrile butadiene styrene and the outer layer is thermoplastic rubber. In certain embodiments, the outer layer has a higher density than the inner layer. In some preferred embodiments, the inner layer is thermoplastic rubber and the outer layer is acrylonitrile butadiene styrene.

DETAILED DESCRIPTION OF PREFERRED EMBODIMENTS

Figure 1:
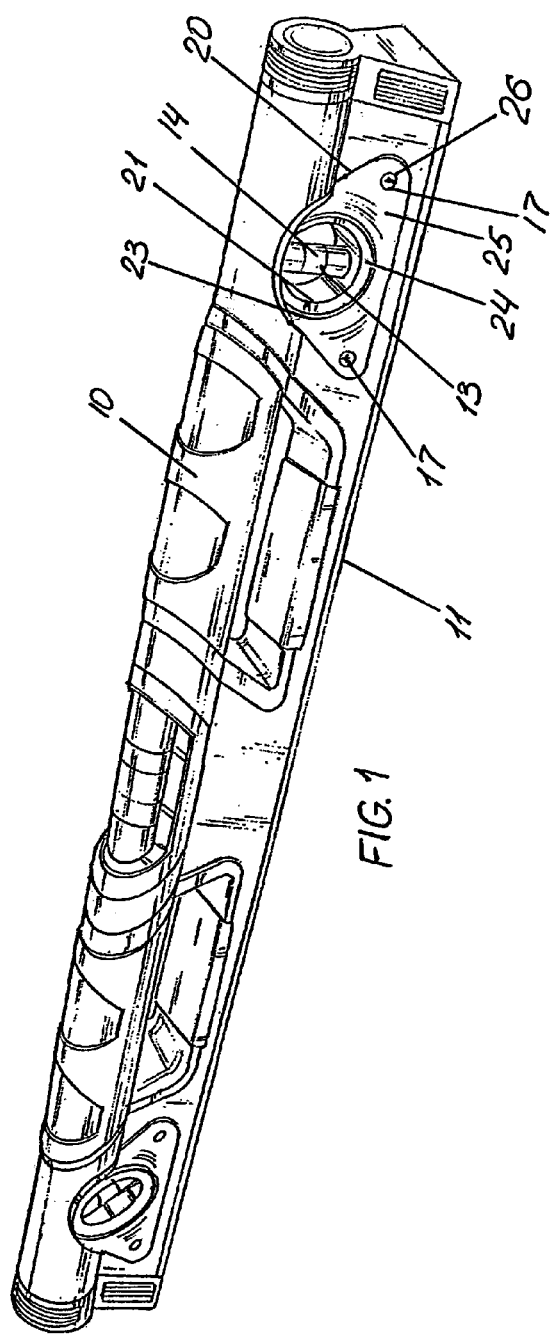
FIG. 1 is a perspective view of a level having a ring member holding a vial in accordance with the principles of an embodiment of the present invention.
Figure 2:
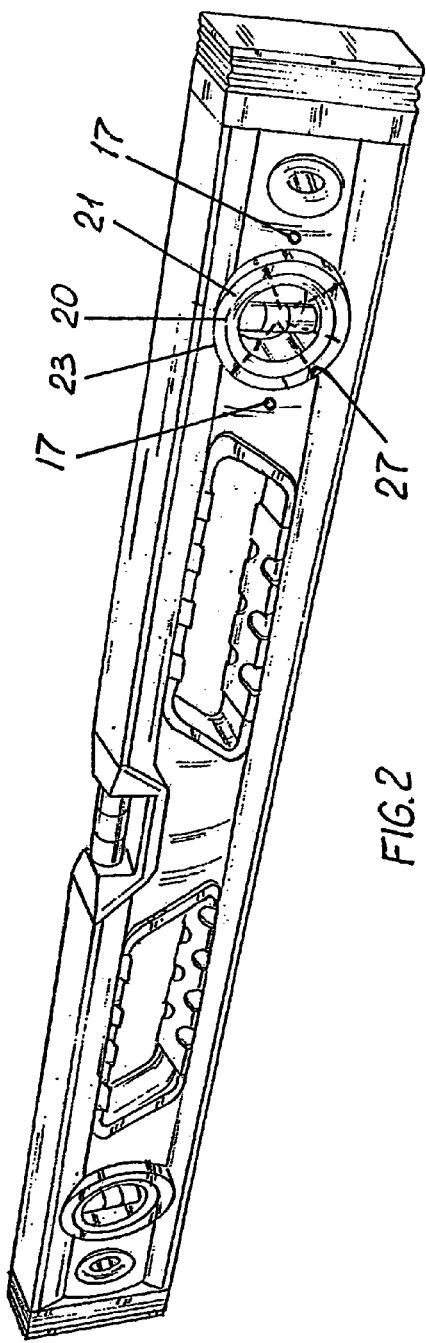
FIG. 2 is a perspective view of an alternate level having a ring member holding a vial in accordance with the principles of an embodiment of the present invention.
Figure 6:
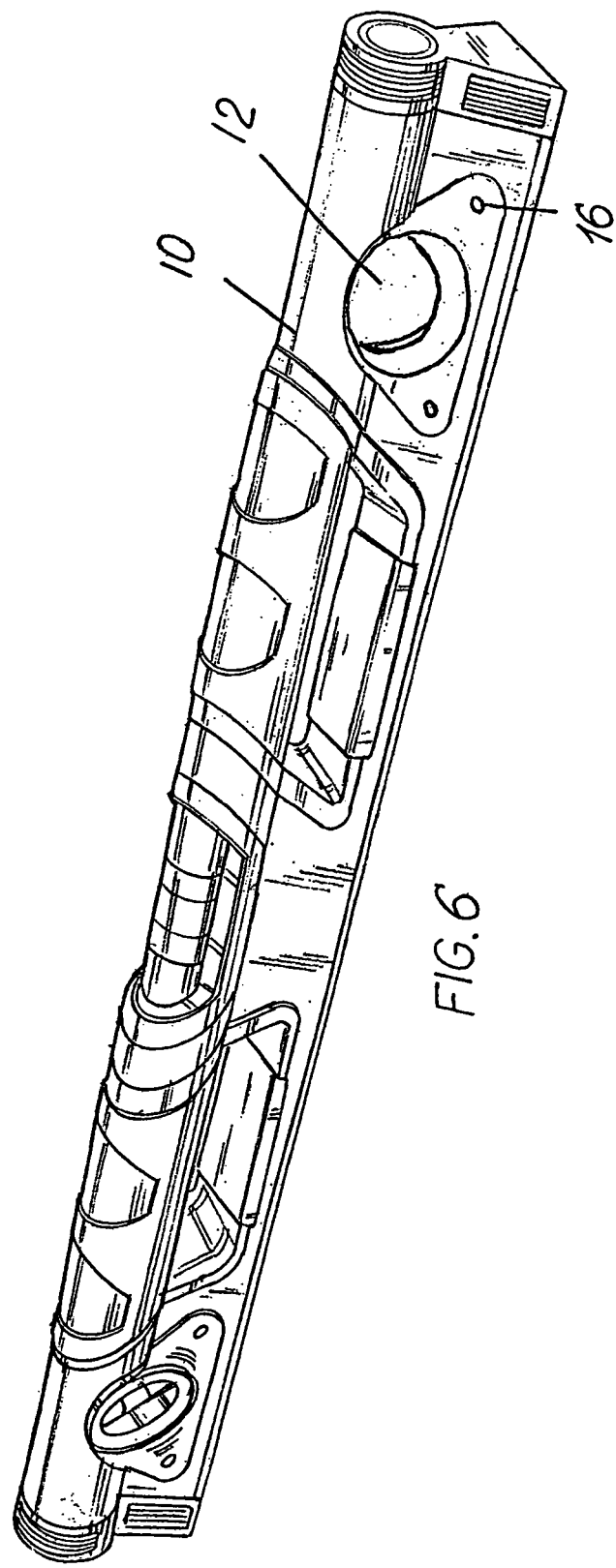
FIG. 6 is a perspective view of the level of FIG. 1 showing a ring member removed.

FIGS. 1 and 2 are perspective views of alternate designs of a level 10 having a ring member 20 holding a vial 13. Level 10 includes a measuring surface 11 for contacting a surface to measure or set its levelness. Level 10 further includes a recess 12 (shown more clearly in FIG. 6) for receiving vial 13.

Vial 13 is received in recess 12 and is fastened therein and held by ring member 20. Ring member 20 includes a front portion 21 and a rear portion 22 (shown in FIGS. 4 and 5). Ring member 20 has a beveled edge 23 and includes a funnel-shaped surface 24 defining slope lines 27. As shown in FIG. 2, slope lines 27 intersect with vial 13, and more exactly, with a central portion 14 of vial 13. Likewise, vial 13 is positioned between the slope lines 27 defined byte funnel-shaped surface 24 on opposite ring portions 21,22 as shown in FIG. 5.

FIG. 1 depicts a ring member 20 having wing members 25 which are external of level 10 when constructed. FIG. 2 depicts a ring member 20 having wing members 25 (shown in FIG. 5) which are internal of level 10 when constructed. In either case, wing members 25 include apertures 26 which can be aligned with openings 16 (shown in FIGS. 5 and 6) such that fasteners 17 may be passed therethrough to fasten ring member 20 to level 10.

Figure 3:
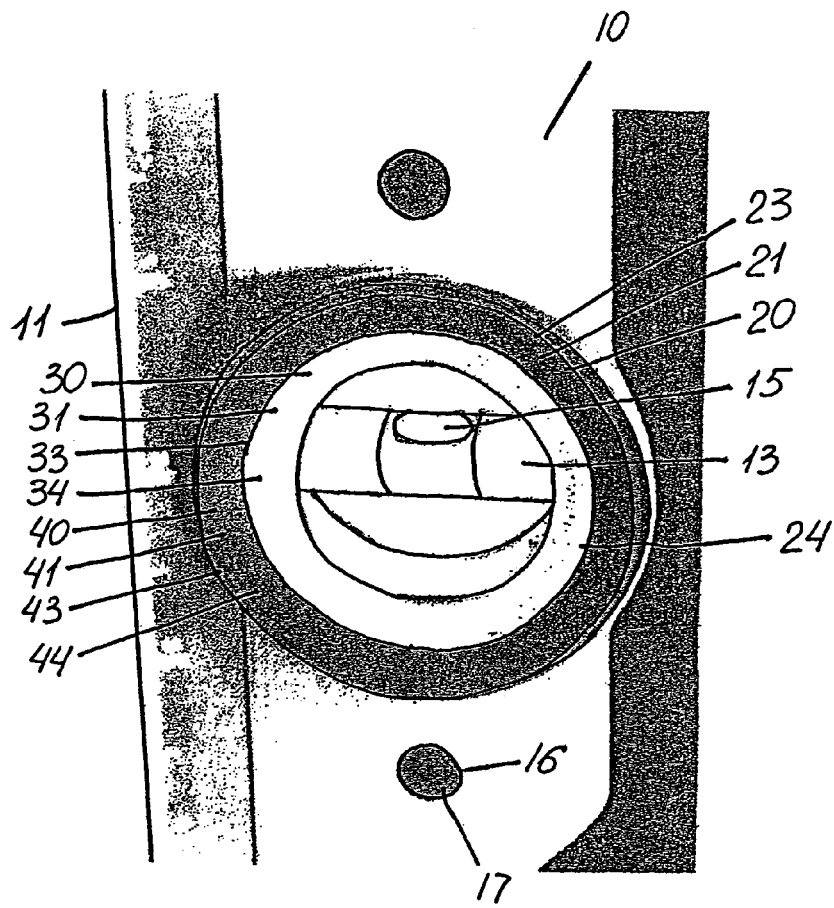
FIG. 3 is an enlarged perspective view of the level of FIG. 2.

As shown in FIG. 3, ring member 20 includes a first ring member or inner layer 30 which has a front portion 31 and a rear portion 32. Each portion includes a beveled edge 33 and a funnel-shaped surface 34 extending therefrom toward the vial.

Ring member 20 also includes a second ring member or outer layer 40. Second ring member 40 includes wing members 25. Second ring member 40 has a front portion 41 and a rear portion 42. Each portion includes a beveled edge 43 and a funnel-shaped surface 44 extending therefrom toward the beveled edge 33 of the first ring member 30. Surfaces 34,44 are coextensive with one another and define slope lines 27 which allow a maximum amount of light to reach vial 13 to increase visibility of the bubble 15 within vial 13.

Figure 4:
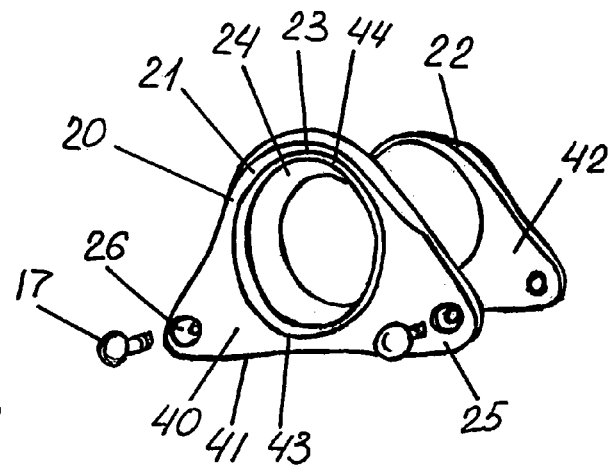
FIG. 4 is a view of the ring member of FIG. 1.
Figure 5:
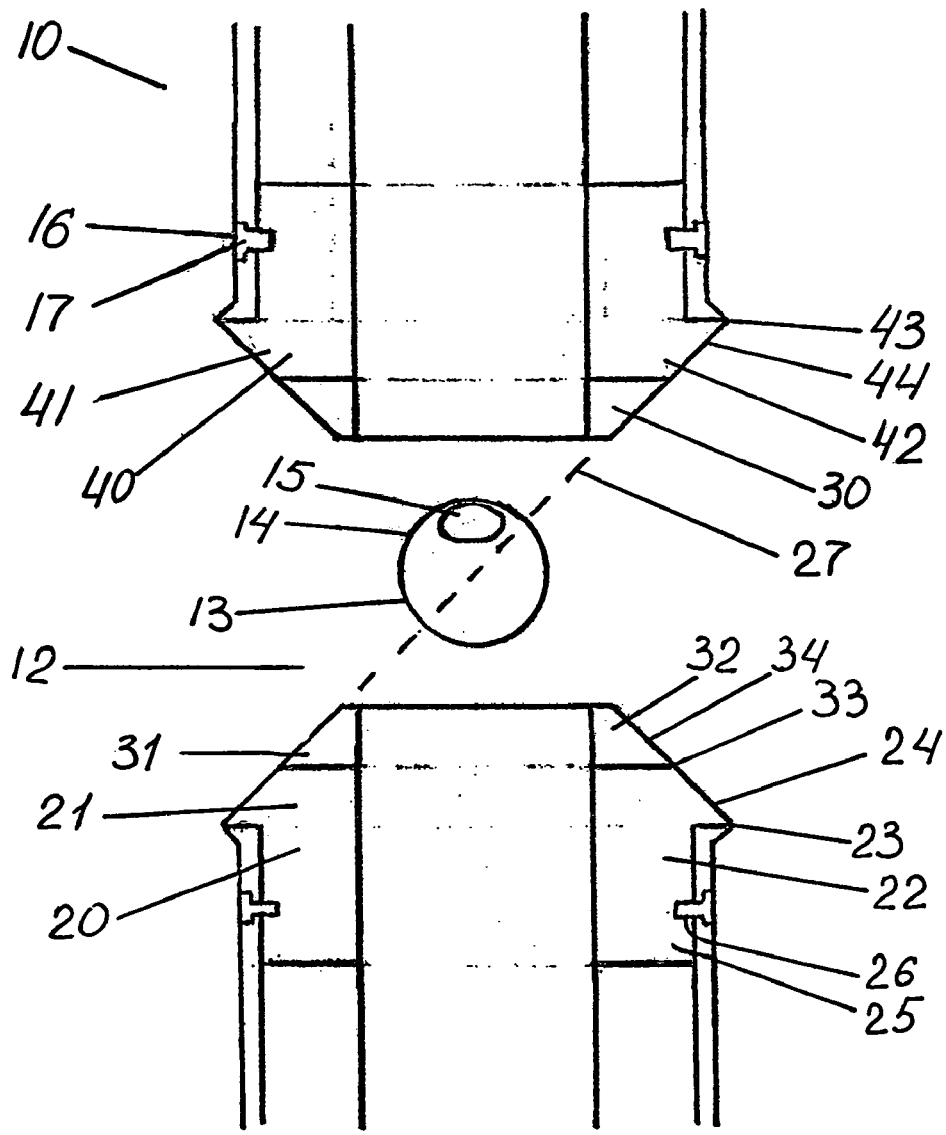
FIG. 5 is an enlarged cross section view of a portion of the level of FIGS. 2 and 3.

FIG. 4 shows the front and rear portions 21,22 of a ring member 20. More specifically, front and rear portions 41,42 of second ring member or outer layer 40 are shown.

Thus, it should be apparent that there has been provided, in accordance with the present invention, a vial for use with levels that fully satisfies the objectives and advantages set forth above.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method of mounting a vial in a level providing impact resistance and increased visibility of the vial, the method comprising:
provide the level with a body having a front sidewall, a rear sidewall, a recess extending through the body from the front sidewall to the rear sidewall, and a measuring surface abutting both sidewalls;
positioning the vial in the recess at an angular relationship to the measuring surface; and
enclosing the vial within the recess with a ring member, the ring member comprising front and rear portions with the vial positioned therebetween, the portions being circular and having beveled edges forming a funnel-shaped surface, the front portion extending outward from the the front sidewall and the rear portion extending outward from rear sidewall.

2. The method of claim 1 wherein the ring member is a first ring member with first front and rear portions, the method further comprising enclosing the first ring member with a second ring member having front and rear portions, the second portions having a funnel-shaped surface aligned with the funnel-shaped surface of the first portions.

3. The method of claim 2 wherein the second portions include wing members having apertures therein and wherein the level has openings spaced from the recess, the method further comprising securing the second ring member to the level by passing fasteners through the apertures and the openings.

4. The method of claim 2 wherein the first and second ring members have contrasting colors to outline the vial.

5. The method of claim 2 wherein the second ring member is a soft elastomeric providing impact-absorption to the level.

6. The method of claim 5 wherein the first and second ring members are bonded together before the vial is enclosed in the recess.

7. A level having a vial secured thereto, the level comprising:
a body having a front sidewall, a rear sidewall, a measuring surface abutting both sidewalls, and a recess extending through the body from the front sidewall to the rear sidewall;
a vial positioned in the recess at an angular relationship to the measuring surface; and
a ring member enclosing the vial within the recess, the ring member comprising front and rear portions with the vial positioned therebetween, the front and rear portions being circular and each portion having beveled edges forming a funnel-shaped surfaces, the front portion extending outward from the front sidewall and the rear portion extending outward from the rear sidewall.

8. The level of claim 7 wherein the ring member is a first ring member with first front and rear portions, the level further comprising a second ring member enclosing the first ring member, the second ring member having front and rear portions, the second portions having a funnel-shaped surface aligned with the funnel-shaped surface of the first portions.

9. The level of claim 8 wherein the second portions include wing members having apertures therein and wherein the level has openings spaced from the recess, the apertures and openings receiving fasteners to secure the second ring member to the level.

10. The level of claim 8 wherein the first and second ring members have contrasting colors to outline the vial.

11. The level of claim 8 wherein the second ring member is a soft elastomeric providing impact-absorption to the level.

12. The level of claim 8 wherein the first and second ring members are bonded together.

13. A level having a vial secured thereto, the level comprising:
a body having a measuring surface and a recess extending through the body from a front sidewall to a rear sidewall;
a vial positioned in the recess at an angular relationship to the measuring surface, the vial including a central portion where a bubble rests when the measuring surface is at a desired orientation; and
a ring member enclosing the vial within the recess, the ring member engaging the vial and the front and rear sidewalls, the ring member being circular and having a beveled edge forming a funnel-shaped surface, each point along the edge defining a slope line, each of the slope lines intersecting the central portion,
whereby the vial is protected by the body and ring member while visibility of the vial is enhanced.

14. The level of claim 13 wherein the ring member includes wing members having apertures therein and wherein the level has openings spaced from the recess, the apertures and openings receiving fasteners to secure the ring member to the level.

15. The level of claim 13 wherein the ring member includes inner and outer layers, the inner and outer layers having contrasting colors to outline the vial.

16. The level of claim 15 wherein the inner and outer layers are elastomeric and provide impact-absorption to the level.

17. The level of claim 16 wherein the inner layer is acrylonitrile butadiene styrene and the outer layer is thermoplastic rubber.

18. The level of claim 16 wherein the outer layer has a lower density than the inner layer.

19. A level comprising:
a body having a measuring surface and a recess extending through the body from a front sidewall to a rear sidewall;
a vial positioned in the recess at an angular relationship to the measuring surface; and
a ring member enclosing the vial within the recess, the ring member comprising a first ring member having first front and rear portions with the vial positioned therebetween, the first portions being circular and having beveled edges forming a funnel-shaped surface, and a second ring member having second front and rear portions, the second portions being circular and having beveled edges forming a funnel-shaped surface aligned with and abutting the funnel-shaped surface of the first portions, the front portions being positioned adjacent to the front sidewall and the rear portions being positioned adjacent to the rear sidewall.

* * * * *

UNITED STATES PATENT AND TRADEMARK OFFICE
CERTIFICATE OF CORRECTION

| | | |
|---|---|---|
| PATENT NO. | : 7,150,107 B2 | Page 1 of 1 |
| APPLICATION NO. | : 10/826941 | |
| DATED | : December 19, 2006 | |
| INVENTOR(S) | : Charles D. Kim | |

It is certified that error appears in the above-identified patent and that said Letters Patent is hereby corrected as shown below:

Column 4, line 28, delete "byte" and insert --by the--.
Column 5, line 50, delete "surfaces" and insert --surface--.

Signed and Sealed this

Third Day of April, 2007

JON W. DUDAS
*Director of the United States Patent and Trademark Office*